Patented Mar. 14, 1950

2,500,732

UNITED STATES PATENT OFFICE 2,500,732

PROCESS OF PREPARING MONOETHYL-DIBENZOFURAN

Royal K. Abbott, Jr., Pittsfield, Mass., assignor to General Electric Company, a corporation of New York No Drawing. Application June 13, 1946, Serial No. 676,568

3 Claims. (Cl. 260—346)

This invention relates to a method preparing a monoethyldibenzofuran. More particularly the invention is concerned with a method of preparing a monoethyldibenzofuran comprising ethylating dibenzofuran in the presence of a Friedel-Crafts type catalyst, e. g., aluminum chloride, aluminum bromide, ferric chloride, zinc chloride, titanium chloride, hydrogen fluoride, boron trifluoride, etc.

The following equation illustrates the reaction involved in employing the method of my invention:

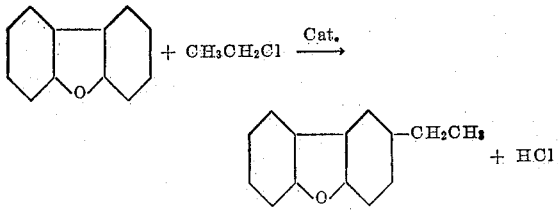

In the reaction illustrated above, ethyl chloride is the ethylating agent and the particular monoethyldibenzofuran shown as the product is 2-ethyldibenzofuran, although isomers of monoethyldibenzofuran other than the 2-substituted isomer also are formed during the reaction. Other ethylating agents, e. g., ethyl bromide and ethylene, may also be used as will be pointed out hereinafter in more detail.

In general, in ethylating dibenzofuran according to my invention, the dibenzofuran and catalyst are first placed in a pressure reaction vessel and the ethylating agent is then added. Pressure is employed if necessary, in order to add the desired quantity of ethylating agent to the mixture in the pressure vessel. For example, when ethyl chloride, which boils at a temperature only slightly below ordinary room temperatures, is the ethylating agent, only a slight amount of pressure is necessary on the pressure vessel and the ethyl chloride to keep the ethyl chloride in liquid form. On the other hand, when ethylene, which boils at about −104° C., is used as the ethylating agent, the pressure in the reaction vessel must be raised to appreciably higher values, depending on the size of the reaction vessel, in order to add the necessary quantity of ethylene to the dibenzofuran and catalyst in the vessel.

Various ratios of ethylating agent to dibenzofuran may be employed in this reaction, depending on the quantities of by-products which can be tolerated. However, for optimum yield of the monoethyldibenzofuran it is preferable to use from slightly more than 1 mol to approximately 1.5 mols of the ethylating agent per mol of dibenzofuran in the reaction mixture.

Only a relatively small amount of the Friedel-Crafts type catalyst is necessary to carry out the reaction. For example, when aluminum chloride is used as a catalyst, 0.05 to 0.1 mol of aluminum chloride per mol of dibenzofuran is preferable.

After the dibenzofuran, ethylating agent, and catalyst have been placed in the reaction vessel, the vessel is sealed and the temperature of the reaction mixture is raised slowly to from about 80° C. to 90° C. The reaction mixture is slowly agitated during heating. The heat is then cut off and the reaction mass is allowed to cool slowly to room temperature. Pressure is then released from the reaction vessel and the pasty reaction mass is dissolved in a solvent, e. g., trichloroethylene, to facilitate handling the material in the subsequent washing and filtering operations. The solution is washed with water, 5 per cent aqueous sodium carbonate solution, and again with water several times. The solution is then filtered and the solvent is removed by stripping on a water pump. The crude reaction product is then distilled and fractionated, as will be described in more detail hereinafter, and a fraction boiling between 175° C. and 180° C. at 15 mm. pressure is obtained as monoethyldibenzofuran.

It should be understood that compounds other than the monoethyldibenzofuran isomers are formed during the reaction. In addition to small amounts of unreacted dibenzofuran, there are present in the reaction mass varying quantities of diethyldibenzofuran, as well as more highly substituted derivatives of dibenzofuran.

When ethyl chloride is used as the ethylating agent, hydrogen chloride is formed during the reaction in the ratio of one mol of hydrogen chloride per mol of ethyl chloride reacted. In view of the fact that the reaction is carried out in a closed vessel, making it impossible for the hydrogen chloride to escape, the reaction reaches equilibrium at a point short of complete reaction of the dibenzofuran present. When a large excess of ethyl chloride is added in order to more completely react the dibenzofuran, increased quantities of higher ethylated dibenzofurans, specifically diethyldibenzofurans, are present in the reaction mass. By carrying out the ethylation in the presence of aluminum turnings which will combine with the anhydrous hydrogen chloride and permit the reaction to proceed further toward completion without the necessity of a large excess of ethyl chloride, the formation of the higher ethylated dibenzofurans is minimized.

In order that those skilled in the art may better understand how to practice the present invention, the following examples are illustrative of the procedure which may be used in the preparation of monoethyldibenzofuran:

Example 1

8400 gms. (50 mols) of dibenzofuran and 664 gms. (5 mols) of aluminum chloride were placed in a five-gallon autoclave at room temperature. 4840 gms. (75 mols) of ethyl chloride was added under the slight pressure necessary to keep it liquid at 25° C. The temperature of the autoclave was slowly increased so that over the course of three hours it reached a temperature of about 80° C. It was then allowed to cool to room temperature for a period of the order of 16 hours. The reaction mixture was agitated slowly during the heating period but was allowed to stand without agitation during the cooling period. It was necessary to valve the hydrogen chloride which was formed during the reaction before opening the autoclave. Two gallons of trichloroethylene was added to dissolve the soft pasty mass in the autoclave and the resulting solution was pushed out of the autoclave by slight air pressure into a tank containing water. The organic layer was separated from the aqueous layer and was then washed three times with water, once with 5 per cent sodium carbonate solution, and once more with water. The solution was then filtered through paper and stripped of solvent on a water pump. This crude mixture containing dibenzofuran, the various isomers of monoethyldibenzofuran, and diethyldibenzofuran was distilled at a pressure of 15 mm. The cut boiling from 165° to 185° C. was taken as crude monoethyldibenzofuran.

The separation accomplished by this first distillation was only approximate, appreciable quantities of dibenzofuran and diethyldibenzofuran still remaining in the distillate with the monoethyldibenzofuran isomers. In order to obtain the 2-ethyldibenzofuran isomer, the above distillate was carefully redistilled at 15 mm. pressure and a cut boiling from 175° C. to 180° C. was taken as 2-ethyldibenzofuran.

Example 2

672 gms. (4 mols) of dibenzofuran and 54 gms. (0.4 mol) of aluminum chloride were placed in a three-liter bomb which was then closed and filled with ethylene to a pressure of 500 pounds per square inch at room temperature. The calculated pressure for four mols of ethylene under these conditions was 480 pounds per square inch. After the ethylene had been added, the temperature of the bomb was raised slowly to 90° C. over a period of about three hours and held at that temperature for about one hour. The heat was then shut off and the bomb was allowed to cool over a period of about one and one-half hours to 80° C. During this entire period of heating and cooling to 80° C. the reaction mixture was slowly agitated. After the temperature had dropped to 80° C., agitation was stopped and the reaction mass was allowed to cool to room temperature. Pressure was then released from the bomb and the semi-fluid, pasty reaction product was dissolved in trichlorethylene. The solution was then washed with water and 5 per cent sodium carbonate solution, filtered, and the solvent stripped in the manner described in Example 1. The washed reaction mass was distilled at 13 mm. pressure and a cut boiling from 148° C. to 222° C. was taken for redistillation. This cut, which contained unreacted dibenzofuran, diethyldibenzofuran, and the various monoethyldibenzofuran isomers, was carefully redistilled as described in Example 1, and a fraction boiling from 175° C. to 180° C. was taken as 2-ethyldibenzofuran.

The monoethyldibenzofuran isomers prepared by the method of my invention are useful as intermediates in the preparation of other compounds. For example, they may be employed in the preparation of vinyldibenzofuran as described and claimed in my copending application, Serial No. 676,569 filed concurrently herewith, and assigned to the assignee of the present invention.

What I claim as new and desire to secure by Letters Patent of the United States is:

1. The method of preparing 2-ethyldibenzofuran which comprises reacting ethyl chloride and dibenzofuran in the presence of aluminum chloride as a catalyst, the said ingredients being employed in the ratio of approximately 1.5 mols of ethyl chloride and 0.1 mol of aluminum chloride per mol of dibenzofuran and the said reaction being effected by heating the reaction mixture to approximately 80° C., and separating 2-ethyldibenzofuran from the resulting reaction mass.

2. The method of preparing 2-ethyledibenzofuran which comprises (1) heating under pressure and in the presence of aluminum chloride as a catalyst a mixture of ingredients comprising an ethylating agent and dibenzofuran wherein the ethylating agent is present in a molar ratio of from 1 to 1.5 mols thereof per mol dibenzofuran and the aluminum chloride is present in the molar ratio of from 0.05 to 0.1 mol of the latter per mol of dibenzofuran, and (2) separating the 2-ethyldibenzofuran from the resulting reaction mass.

3. The method of preparing 2-ethyldibenzofuran which comprises (1) heating a mixture of ingredients comprising ethyl chloride and dibenzofuran under pressure and in the presence of aluminum turnings and aluminum chloride as a catalyst, the ethyl chloride being present in the molar ratio of from 1 to 1.5 mols thereof per mol dibenzofuran, and the aluminum chloride being present in the molar ratio of from 0.05 to 0.1 mol of the latter per mol dibenzofuran, and (2) separating the 2-ethyldibenzofuran from the resulting reaction mass.

ROYAL K. ABBOTT, JR.

REFERENCES CITED

The following references are of record in the file of this patent:

UNITED STATES PATENTS

| Number | Name | Date |
| --- | --- | --- |
| 2,141,611 | Malishev | Dec. 27, 1938 |

OTHER REFERENCES

"Catalysis," by Berkman et al., pub. by Reinhold Pub. Corp., N. Y. C., 1940, p. 936.

Chemical Abstracts, 1935, vol. 29, page 791, line 5.

An Outline of Organic Chemistry, by Degering, page 341, 1941.